(12) United States Patent
Gonzalez-Sanchez et al.

(10) Patent No.: US 10,633,265 B2
(45) Date of Patent: Apr. 28, 2020

(54) DEVICE FOR CONTAINER WATER FILTERING

(71) Applicants: Narcedalia Gonzalez-Sanchez, Sugar Land, TX (US); Prisciliano Gonzalez-Sanchez, Sugar Land, TX (US)

(72) Inventors: Narcedalia Gonzalez-Sanchez, Sugar Land, TX (US); Prisciliano Gonzalez-Sanchez, Sugar Land, TX (US)

(73) Assignee: Max Pool System, Inc, Sugar Land, TX (US)

( * ) Notice: Subject to any disclaimer, the term of this patent is extended or adjusted under 35 U.S.C. 154(b) by 183 days.

(21) Appl. No.: 15/677,554

(22) Filed: Aug. 15, 2017

(65) Prior Publication Data
US 2019/0055143 A1    Feb. 21, 2019

(51) Int. Cl.
*C02F 1/461* (2006.01)
*C02F 103/42* (2006.01)

(52) U.S. Cl.
CPC ...... *C02F 1/46104* (2013.01); *C02F 1/46109* (2013.01); *C02F 2001/46138* (2013.01); *C02F 2001/46152* (2013.01); *C02F 2103/42* (2013.01); *C02F 2201/006* (2013.01); *C02F 2201/008* (2013.01); *C02F 2201/46125* (2013.01); *C02F 2201/46145* (2013.01); *C02F 2209/02* (2013.01); *C02F 2209/40* (2013.01)

(58) Field of Classification Search
CPC .. C02F 2201/46125; C02F 2201/46105; C02F 2001/46152; C02F 1/46104; C02F 1/46109; C02F 1/46145
See application file for complete search history.

(56) References Cited

U.S. PATENT DOCUMENTS

| | | | | |
|---|---|---|---|---|
| 2002/0088710 A1* | 7/2002 | Powell | ............... | C02F 1/463 204/267 |
| 2004/0035696 A1* | 2/2004 | Reinhard | ............... | B01D 61/50 204/252 |
| 2007/0007145 A1* | 1/2007 | Simmons | ............... | C02F 1/4672 205/357 |
| 2011/0253528 A1* | 10/2011 | Hui | ............... | C02F 1/4674 204/269 |
| 2014/0217035 A1* | 8/2014 | Poyet | ............... | C02F 1/4674 210/748.2 |

(Continued)

*Primary Examiner* — Nicholas A Smith
(74) *Attorney, Agent, or Firm* — Defillo & Associates, Inc.; Evelyn A Defillo

(57) ABSTRACT

The invention relates to a water filtration with a process optimization method, which employ cartridges with conventional electrolytic cells that have electrolytic cells, modified with automated control systems for the purpose of manipulating, monitoring and performing maintenance strategies in a single device, either in mobile containers or in swimming pools, gutters, etc., in such a way that: the purification process of the liquid, preferably water, is increased, the speed of its processing is increased, a process that is conventionally performed manual way is automated; in addition to optimizing the materials used in the purification, the process minimizes the risks of infiltration of impurities in the organism by immersion in treated waters with high pollutant levels; finally the process decreases the formation of tartar in the containers.

3 Claims, 5 Drawing Sheets

(56) References Cited

U.S. PATENT DOCUMENTS

2014/0326680 A1\* 11/2014 Mastio ................. C25B 1/26
 210/747.5
2014/0367344 A1\* 12/2014 Faure ................. C02F 1/4606
 210/748.18

\* cited by examiner

DEVICE FOR CONTAINER WATER FILTERING

FIELD OF INVENTION

The present invention relates to technologies that perform a water filtration with a process optimization method, which employ conventional filters having electrolytic cells, modified with automated control systems for the purpose of manipulating, monitoring and performing control strategies. Maintenance in a single device either in mobile containers or in swimming pools, drains, etc.

BACKGROUND OF THE INVENTION

The importance of implementing in fixed or mobile containers has a direct correspondence with the health of the people, since often the impurities contained in these liquids (preferably water), could trigger health consequences to those who use them, either by filtering or simply dipping into it; the present technology does not imply ingestion, but direct contact with skin. In the prior art the following technologies:

The prior art presents a device that makes possible to perform the electrolysis of aqueous solutions inside any vessel, tank or container, either open or closed, with the possibility of connecting any type of electrode made from different materials and having different forms and intended for different purposes. For this purpose, the holder is formed by a housing in the form of an inverted pan which is open internally, the top end of said housing being provided with sealed access means for a pair of cables of opposing polarity, which branch off inside the housing so as to terminate in respective electrical junctions to which at least two contacts are connected, the latter being provided with means for the connection of corresponding electrodes. The sealed access means, the cables, the electrical junctions and part of the strips or contacts are kept perfectly insulated inside the housing by filling the latter with an insulating filling material such as polyester or the like.

In addition, the prior art presents a process apparatus comprises at least one elongate hollow semi-permeable member, at least one anode and at least one cathode. The anode and cathode are arranged radially and concentrically with respect to the semi permeable member. Preferably the hollow semi-permeable member is a filter element such as a water filter element and may be formed as an anode or cathode. There may comprise a plurality of hollow semi-permeable members and associated anodes and cathodes and a housing adapted to communicate liquid from the housing inlet 8 through the plurality of hollow semi-permeable members to an outlet. Also disclosed is a process apparatus characterized by an anode in the form of an elongate hollow member comprising a semi-permeable wall and a cathode arranged radially and concentrically with respect to the anode. Advantageously the process apparatus provides a compact arrangement incorporating conventional filtration and an integrated, compact electrolysis function.

Furthermore, the prior art presents a method for reducing the amount of polluting and/or valuable elements through application of electrolysis, in particular of the electro capturing phenomenon. The electrolysis according to the present invention is applied permanently over time in a polluted water body. The predetermined action area preferably has a smaller extension than the water body. The at least one phenomenon is preferably powered electrically through production of electrical energy in loco through at least one renewable energy source. The method is suitable for purifying large expanses of water, like seas, lakes, lagoons and rivers, through plants operating permanently, however this does not rule out other applications.

Another prior art presents a power control device that on the basis of input DC power, supplies electrolytic voltage and electrolytic current to an electrolysis tank in which current is passed between an anode and a cathode in order to electrolyze water and produce electrolyzed water. The power control device is provided with a voltage/current control circuit that: controls in a fixed current control mode so that the electrolytic current does not surpass the current value of a reference current that is set in advance in accordance with the rated current of a single cell that constitutes the electrolysis tank, while supplying the electrolytic current to the electrolysis tank; and controls in a fixed voltage control mode so that the electrolytic voltage does not surpass the voltage value of a reference voltage that is set in advance in accordance with the rated voltage and number of single cells that constitute the electrolysis tank while supplying the electrolytic voltage to the electrolysis tank. The voltage/current control circuit switches between the fixed current control model and the fixed voltage control mode in accordance with the density of a liquid to be electrolyzed within the electrolysis tank.

Finally, the prior art presents a hydrogen generating unit for producing hydrogen water, and more particularly, to a hydrogen generating unit which has a structure that is relatively small in volume and simple so as to be easily applied to a small capacity hydrogen water producing apparatus for home or business use, and particularly, in which when an upper electrode and a lower electrode are fastened, an upper cover and a lower cover, which have been used for the hydrogen generating unit in the related art devised by the applicant of the present invention, are not used, but instead, the upper electrode and the lower electrode may be positioned between a cap at the upper side and a housing at the lower side, and the upper electrode and the lower electrode may be assembled together, when the cap and the housing are coupled to each other, thereby reducing the number of components used for the hydrogen generating unit, simplifying manufacturing processes, and achieving excellent assembly properties.

Nevertheless, and despite being complex technologies, the one presented in this application poses some additional advantages that result in significant technical effects that support its novelty as:
- Improves the efficiency of the liquid purification process, preferably water.
- Increases processing speed.
- Automates a process that is conventionally performed manually.
- Optimizes materials used in purification.
- Minimizes the risks of infiltration of impurities in the body by immersion in treated waters with high pollutant levels.
- Reduces the formation of tartar in containers.

SUMMARY OF THE INVENTION

A device for the filtration of water in containers comprising an electrolysis cartridge with electrified plates and an automation device which act synergistically, the device including: at least three metal rectangular plates on the electrolysis cartridge, each of the rectangular plates includes one end having a groove that forms a folded terminal; at least one interleaved plate placed between the at least three rectangular metal plates, the at least one interleaved plate is placed equidistantly between the plates with terminals; the at least three metal rectangular plates and the interleaved plates are placed inside a casing having threaded ends and with an inner walls having a pair of grooved insulating plates with channels disposed towards a center of the casing; each channel of each one of the grooved insulation plate coincides in arrangement and size with respect to the channel of the opposing grooved insulation plate, in such a way that the plates and the interleaved plates are inserted into each pair of the channels of the insulation plates; an innermost end of each insulation plate includes a stop to detain the advance of the plates, and at the opposite end of each insulation plate includes a lock having a T shape having at least one groove; wherein if one of the grooves is at a crossing point of the lines forming it, and that said groove coincides in size and shape to accommodate the fold of the extension being in the at least one of the metal rectangular plates; on an opposite section from where the groove is located, the lock has a fold having a form of a square "U" to be supported on the edge of the insulation plate in which the lock is placed and that the insulation plate has an groove to ensure a correct positioning of the lock; when the lock is placed in the groove, a cross section that forms the T shape presses the plates, avoiding that they travel in the channels, at the same time, the fold has a flange that when closing the cartridge is arranged on the inside of a first lid causing the closure; a lid includes a first cylindrical section attached to a surrounding plate which at an end of which is attached to the cylindrical section has a stop which engages in a notch at the edge of the casing, toward the center of the lid, on the side where the stop is located, there is a second cylindrical section, which supports a gasket, which performs an airtight seal between the casing and the lid; the casing and the lid are secured by a threaded ring in its internal section and grooved by its outer face whose thread is engaged in the casing, since the latter has the counterpart of the thread of the ring; on the outside of the casing, immediately after the ring, a surrounding casing is placed which contacts the terminals of the plates in such a way that by employing as many conventional cables attached to the terminals as are inserted into a Insulating casing, submerged in epoxy resin which protects them, the opposite end is attached to a conventional automation control box in order to electrify the plates inside the housing; at the opposite end of the casing, a second cap is screwed with the same characteristics as the first cap; however, the automation device comprises a T connection in the cross section of a plug that seals are inserted and has a hole centered through which is a stem forming a single piece with a blade positioned inside the connection, the opposite end of said rod activates a flow sensor which is conventionally connected to a PCB electronic board and in the same way, the card is connected to a temperature sensor which is placed in the T connection, on one side Of the stem, said sensor measures the temperature of the water flow through the T connection, at the same time the water passage activates the stem and the previous measurements are sent to a logical processing unit to automate the process.

BRIEF DESCRIPTION OF THE FIGURES

The characteristic details of this novel improved device for the filtration of water in containers are clearly shown in the following description and in the accompanying drawings, as well as that description where the same reference signs are followed to indicate the parts and figures shown.

DETAILED DESCRIPTION OF THE INVENTION

Figure 1:
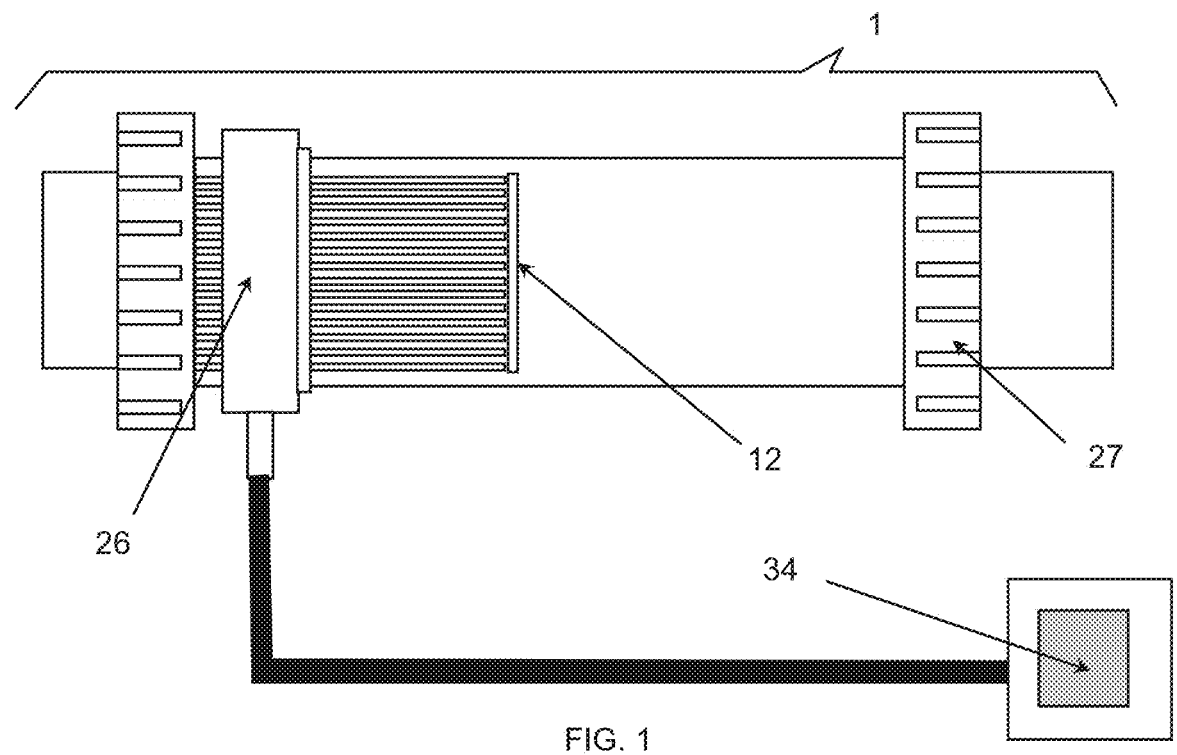
FIG. 1 is a side view of the electrolysis cartridge of the improved device for the filtration of water in containers.
Figure 2:
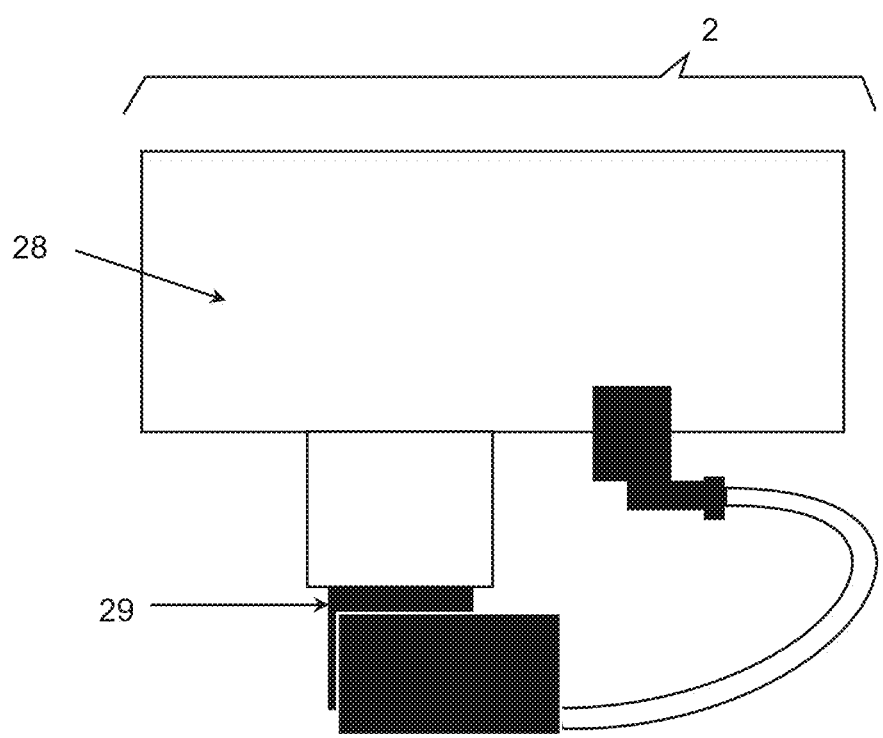
FIG. 2 is a side view of the mechanism for measuring flow and temperature sensing employed in the improved device for filtering water in containers.
Figure 3:
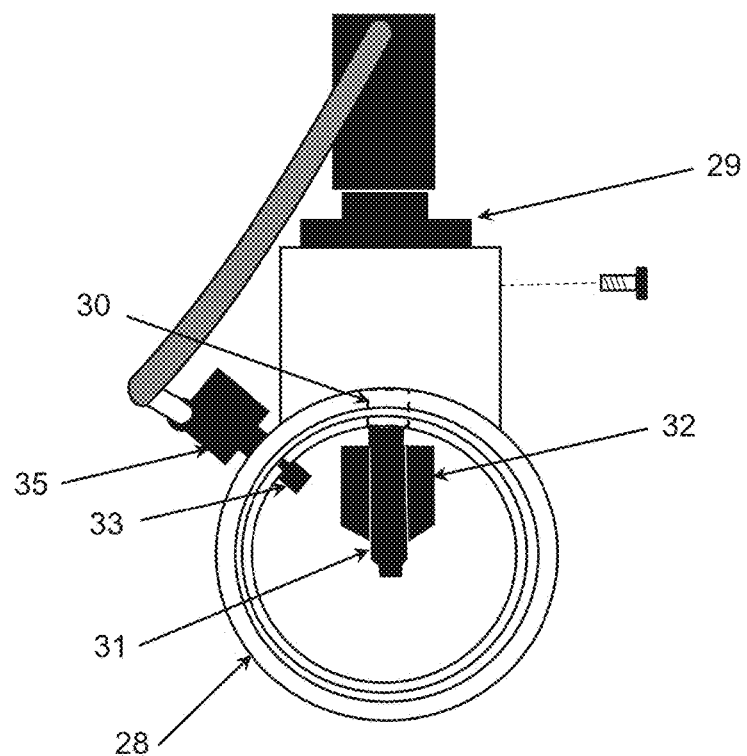
FIG. 3 is a front view of the mechanism for measuring flow and temperature sensing employed in the improved device for the filtration of water in containers.
Figure 4:
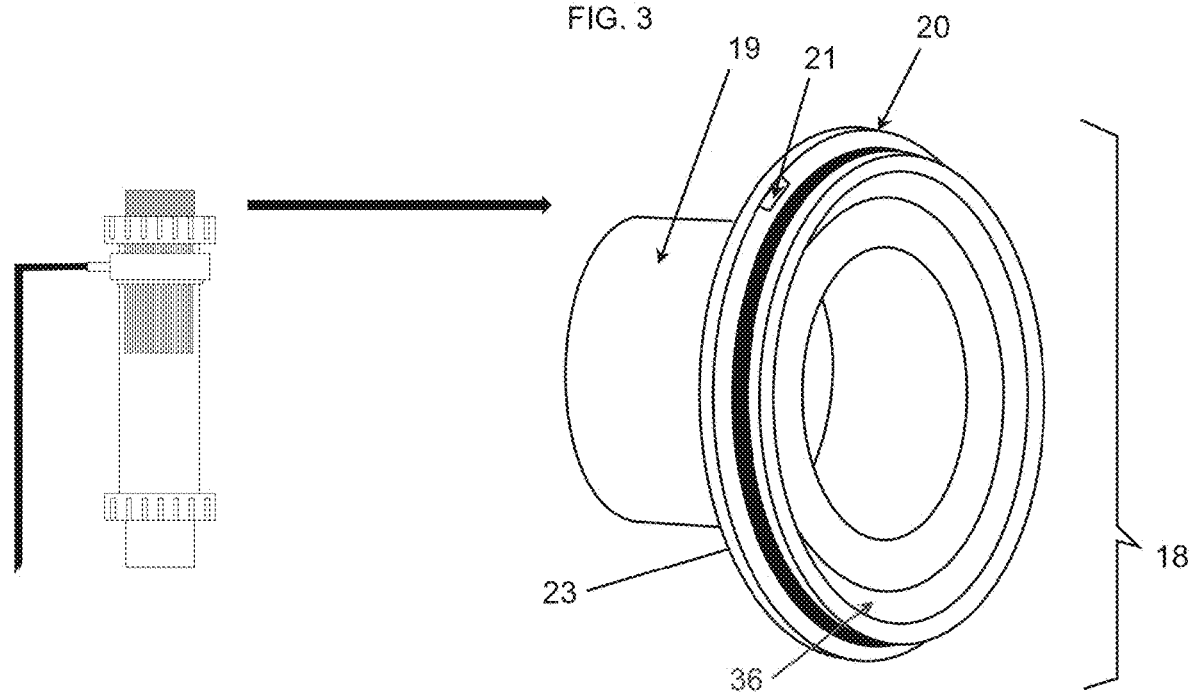
FIG. 4 is a conventional perspective view, enlarged and referenced to a scaled model of the electrolytic cartridge lid of the improved device for the filtration of water in containers.
Figure 5:
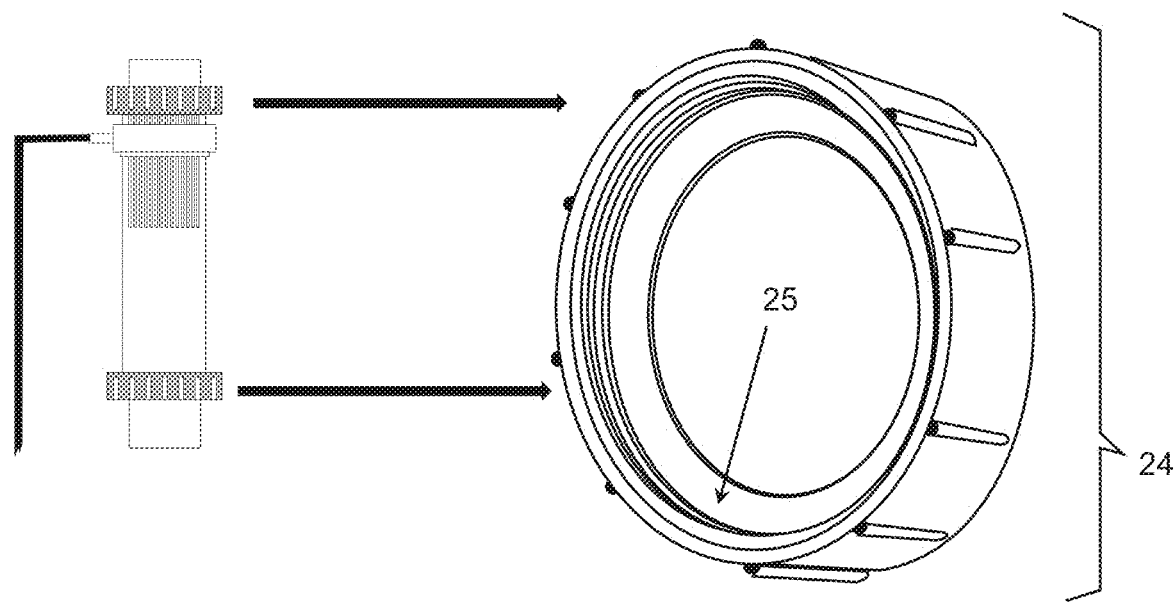
FIG. 5 is a conventional perspective view, enlarged and referenced to a scale model of the second cylindrical section holding the lid of the electrolysis cartridge of the improved device for the filtration of water in containers.
Figure 6:
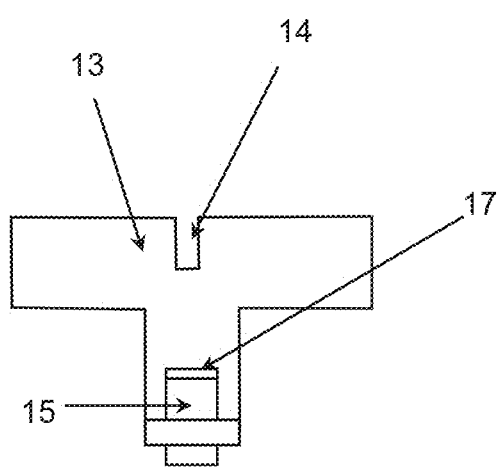
FIG. 6 is a top view of the T-shaped lock which stops the plates inside the electrolysis cartridge of the improved device for the filtration of water in containers.
Figure 7:
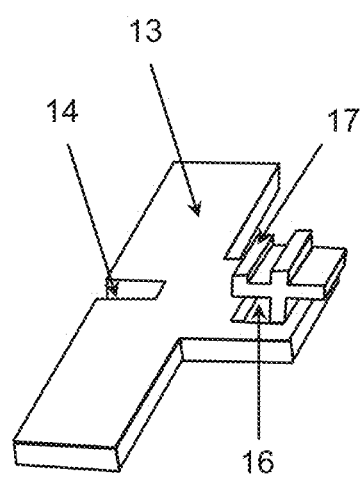
FIG. 7 is a lower conventional perspective view of the T-shaped lock which stops the plates inside the electrolysis cartridge of the improved device for the filtration of water in containers.
Figure 8:
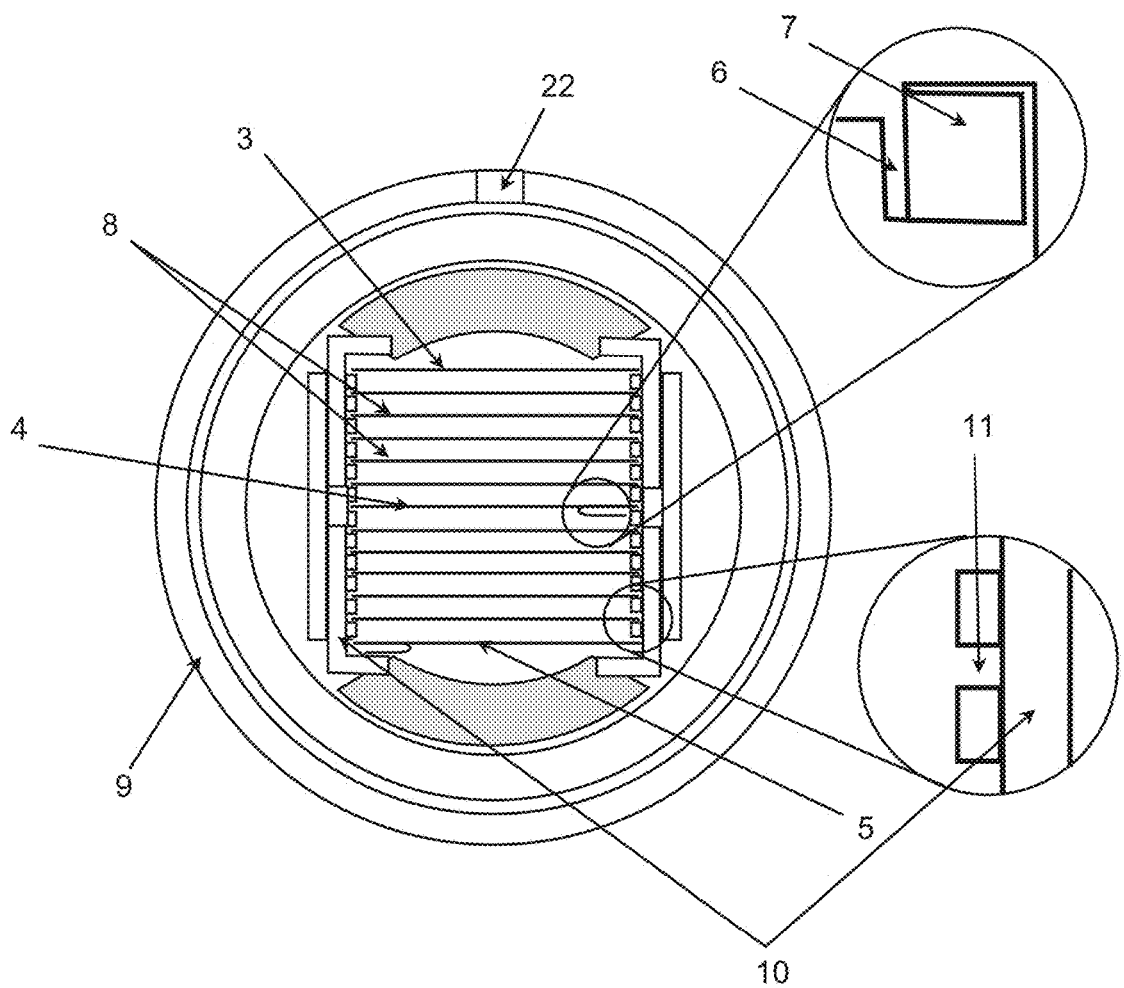
FIG. 8 is a front view of the electrolysis cartridge of the improved device for the filtration of water in containers.
Figure 9:
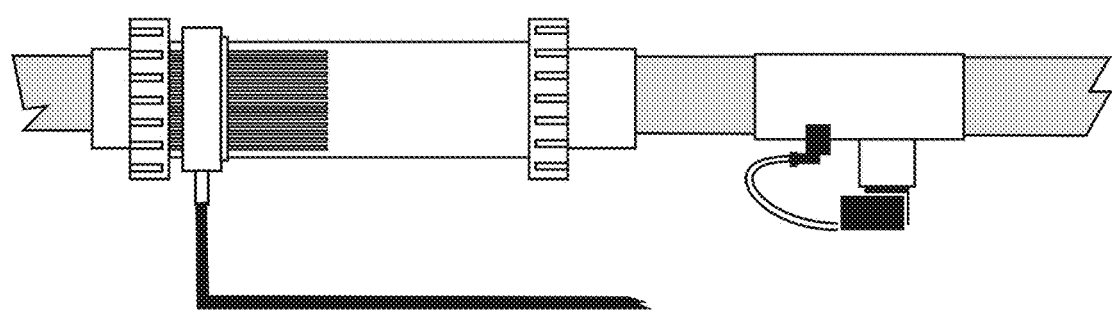
FIG. 9 is a side view, installed in a conventional liquid flow line, with the mechanism for measuring flow and temperature sensing and the electrolysis cartridge of the improved device for the filtration of water in containers.
Figure 10:
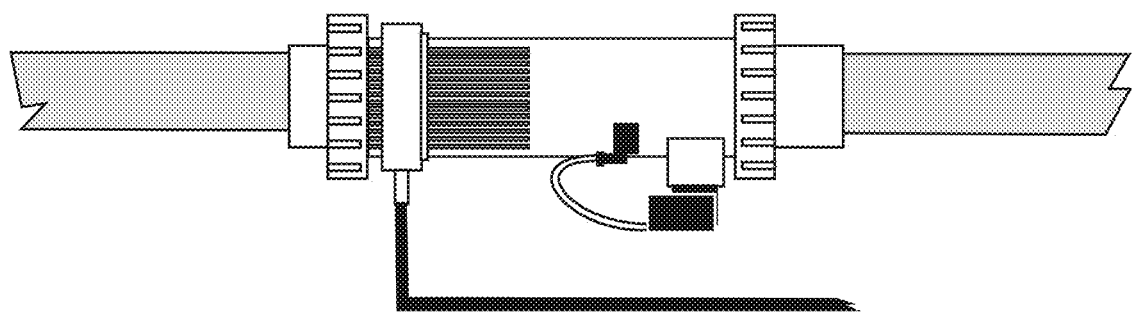
FIG. 10 is an installed side view of the variant of the electrolysis cartridge of the improved device for the filtration of water in containers.

Based on the above figures the improved device for the filtration of water in containers comprises two main elements: a cartridge for electrolysis 1 and an automation device 2 acting synergistically; wherein the electrolysis cartridge 1 comprises at least three rectangular metal plates 3, 4 and 5 (preferably of stainless metals and coated with corrosion resistant metals which at one end have a groove 6 that forms a folded terminal 7; between these three rectangular metal plates 3, 4 and 5, at least one rectangular plate 8 is disposed equidistantly disposed between the plates with terminals 3, 4 and 5; All the plates 3, 4, 5 and the interleaved plates 8 are placed inside a housing 9 (preferably cylindrical) threaded at their ends and that in the inner walls thereof has a pair of grooved insulating plates 10 whose channels 11 are arranged towards the center of the housing 9, and furthermore each channel 11 of one of the insulating plate 10 coincides in arrangement and size with respect to the channel 11 of the opposing insulating plate 10, such that the plates 3, 4, 5 and the interleaved plates 8 are inserted into each pair of channels 11 of the insulating plates 10; at the innermost end of each insulation plate 10, each has a stopper 12 for stopping the advancement of the plates 3, 4, 5 and 8, and at the opposite end of at least one of the insulation plates 10 places a lock 13, which has a "T" shape. The lock 13 includes at least one groove 14 and a fold 15 on the opposite side of the groove. The groove 14 coincides in size and shape to accommodate the fold of the folded terminal 7 found on any of the plates 3, 4 and 5. The fold of the lock includes a flange which is by an edge of the second insulation plate, when in a closing position the flange is placed inside a first lid causing the closure of the electrolysis cartridge. The fold 15, preferably in the form of a square "U", is supported on the edge of the insulating plate 10 in which it is placed. The lock 13 also has a groove 16 which ensures the correct positioning of the lock 13 preventing the user from mistaking the place for its correct assembly. When the lock 13, is placed in the groove 16, the cross section forming the "T" shape presses the plates 3, 4, 5 and 8, preventing them from traveling in the channels 11, at the same time, the fold 15 has a flange 17 which is by an edge of the second insulation plate, when in a closing position the flange is placed inside a first lid causing the closure of the electrolysis cartridge. The lid 18 comprises a first cylindrical section 19 attached to a surrounding plate 20 which, at the end of which is attached to the cylindrical section 19, has a stop 21, which engages a notch 22 located in the edge of the housing 9, towards the center of the lid 18, on the side of the stop 21, is a second cylindrical section 36, which supports a gasket 23, which makes a seal between the housing 9 and the lid 18; the latter two, the housing 9 and the lid 18 are secured, thanks to a ring 24 threaded in its internal section and grooved by its outer face, the thread of which is engaged in the housing 9, since the latter has the counterpart of the thread of the ring 24; on the outside of the housing 9, next to the ring 24, a surrounding cover 25 is placed, which in its interior contacts the terminals 7 of the plates 3, 4 and 5, in such a way that by employing an equal number of conventional, attached to the terminals 7 are inserted into an insulating cover 26 and submerged in epoxy resin, which protects them and the opposite end is attached to a conventional automation control box, in order to electrify the plates 3, 4 and 5 of the Interior of the housing 9; at the opposite end of the housing 9, a second cap 27 is screwed with similar characteristics as the first lid 18.

Now, the automation device 2 comprises a "T"-shaped connection 28 in the cross-section of which is inserted a plug 29 which seals it and which has a centered perforation 30 through which a stem 31 forming a single piece with a blade 32, remaining within the connection 28; the opposite end of said stem 31 activates a flow sensor 33 which is conventionally connected to a PCB-type electronic board 34; in the same way, the PCB-type electronic board 34 is connected with a temperature sensor 35, which is placed in the connection "T" 28 to one side of the stem 31 and that said sensor measures the temperature of the water flow passing through the connection "T" 28, at the same time the water passage activates the stem 31 and the above measurements are sent (remotely, synchronously or asynchronously) to an external logic processing unit 32 to automate the process.

A first variant of the improved device for the filtration of water in containers described above consists in eliminating the connection "T" 28 and instead using the same housing 9 to which two perforations 33 are made, where the first perforation accommodates the plug 29 and the second blast-hole the temperature sensor 35 in the same housing 9.

Operation of the Invention:

The above-described device therefore constitutes an electrochemical cell which is manipulated from an automated control box, from which the energy arriving at the plates and the charges (positive and negative) is emitted producing the electrolysis inside the housing of the cartridge, at the same time, the flow levels are measured by a sensor that takes the pulse of the hydraulic flow, converting it into an electrical signal which is transmitted to the automation control box; similarly, a second sensor measures the temperature and is transmitted to the same control box which can be controlled manually or fully automated, either by synchronous, asynchronous, or real-time connection.

Having sufficiently described my invention, what I consider as a novelty and therefore, claim of my exclusive property what is contained in the following claims:

What is claimed is:

1. A device for water filtration in containers comprising:
an electrolysis cartridge with electrified plates; and
an automation device operatively connected to the electrolysis cartridge, the automation device synergistically acts with the electrolysis cartridge;
wherein the electrolysis cartridge includes:
a housing having a center, a first inside threaded end, a second inside threaded end, an outer side, and inner walls;
a first insulating plate placed on the first inside threaded end of the housing, the first insulating plate including a first end, a second end, and channels facing the center of the housing;
a second insulating plate placed on the second inside threaded end of the housing, the second insulating plate including a first end, a second end, and channels facing the center of the housing, the channels of the second insulating plate coincide with the channels of the first insulating plate;
at least three metal rectangular plates placed inside the housing, each one of the rectangular plates includes a first end having a folded terminal inserted into a corresponding channel of the inner insulating plate and a second end inserted into a corresponding channel of the outer insulating plate;
at least one interleaved plate placed inside the housing and between the at least three metal rectangular plates, each one of the at least one interleaved plate is placed equidistant between the three metal rectangular plates, each one of the interleaved plates includes a first end inserted into a corresponding channel of the inner insulating plate and a second end inserted into a corresponding channel of the outer insulating plate;
a stopper located on an innermost end of the first insulated plate and the second insulated plate;
a lock located on an outermost end of the first insulated plate and the second insulated plate, each lock has a T-shape, at least one groove, and a fold on the opposite side of the groove, the groove of the lock is connected to the folded terminal of the metal rectangular plates, each one of the folds of the locks is supported by an edge of the corresponding insulated plate, each one of the folds of the locks includes causing the closure of the electrolysis cartridge;
wherein the first lid comprises a first cylindrical section having an end attached to a surrounding plate, the surrounding plates includes a stopper toward a center of the lid, the stopper of the first lid engages in a notch at an edge of the housing, toward the center of the first lid, on the side where the stopper is located, there is a second cylindrical section, which supports a gasket, which performs an airtight seal between the housing and the lid;
a second lid is located opposite to the first lid, the second lid has a structure similar to the first lid;
the housing and the lids are secured by a ring having internal threads and grooves in an outer face, the threads are engaged to the housing;
a surrounding casing is placed on the outside of the housing and next to the ring, an interior side of the surrounding casing contacts the folded terminals of the at least three metal rectangular plates in such a way that by employing as many conventional cables attached to the folded terminals;

an insulating casing having a first end connected to the folded terminals and submerged in an epoxy resin and an opposite second end attached to an automation control box in order to electrify the at least one metal plates inside the housing;

at the opposite end of the casing, a second cap is screwed with the same characteristics as the first cap;

wherein the automation device comprises:

a T-shaped connector having a centered hole;

a stem located on the centered hole, the stem includes a blade;

a flow sensor located on the opposite side of the stem, the stem is connected to the stem;

an electronic board connected to the flow sensor;

a temperature sensor connected to the electronic board, the temperature sensor measures the temperature of water flowing through the T-shaped connector, wherein at the same time the water passage activates the stem and the previous measurements are sent to a logical processing unit for automation.

2. The device according to claim 1, wherein the T-shaped connector is replaced by adding a first and a second perforations to the housing, the first perforation houses a plug and the second perforation houses the temperature sensor.

3. The device according to claim 1, wherein the at least three metal rectangular plates are made of stainless and coated with a corrosion resistant metal.

* * * * *